United States Patent
Naito

(10) Patent No.: US 7,336,733 B2
(45) Date of Patent: Feb. 26, 2008

(54) RADIO BASE STATION APPARATUS, DECODING APPARATUS USED THEREFOR WHICH USES TFCI DECODING CHARACTERISTICS, AND DECODING METHOD THEREFOR

(75) Inventor: Takahiro Naito, Saitama (JP)

(73) Assignee: NEC Corporation, Tokyo (JP)

( * ) Notice: Subject to any disclaimer, the term of this patent is extended or adjusted under 35 U.S.C. 154(b) by 770 days.

(21) Appl. No.: 10/715,466

(22) Filed: Nov. 19, 2003

(65) Prior Publication Data

US 2004/0101071 A1 May 27, 2004

(30) Foreign Application Priority Data

Nov. 27, 2002 (JP) ............................. 2002-344124

(51) Int. Cl.
H03D 1/00 (2006.01)
H04L 27/06 (2006.01)
(52) U.S. Cl. ...................... 375/340; 375/341; 375/346; 714/752; 455/522
(58) Field of Classification Search ........ 375/340–341, 375/346; 714/752; 455/522; 370/342
See application file for complete search history.

(56) References Cited

U.S. PATENT DOCUMENTS

2002/0013926 A1* 1/2002 Kim et al. .................. 714/781
2002/0115443 A1* 8/2002 Freiberg et al. ............. 455/450
2002/0191578 A1* 12/2002 Bachl et al. ................. 370/342
2003/0035467 A1* 2/2003 Shimizu ...................... 375/147
2003/0072290 A1* 4/2003 Hwang et al. ............... 370/342
2004/0125785 A1* 7/2004 DiFazio et al. ............. 370/348

FOREIGN PATENT DOCUMENTS

JP  2001-245359 A  9/2001
JP  2002-026735 A  1/2002

* cited by examiner

Primary Examiner—Curtis B. Odom
(74) Attorney, Agent, or Firm—Whitham Curtis Christofferson & Cook, PC

(57) ABSTRACT

A decoding apparatus includes a radio section, TFCI decoding characteristic feedback section, and dedicated physical data channel correcting section. The radio section receives data on a dedicated physical control channel and data on a dedicated physical data channel, which are coded into a complex code of a single system which is to be transmitted as an uplink signal from a mobile unit to a base station in a 3rd generation cell phone system. The TFCI decoding characteristic feedback section determines the TFCI decoding characteristics of a coded TFCI code on the dedicated physical control channel. The dedicated physical data channel correcting section performs data correction for the dedicated physical data channel on the basis of a determination result on the TFCI decoding characteristics. A decoding method and radio base station apparatus are also disclosed.

7 Claims, 17 Drawing Sheets

BASIS SEQUENCES FOR (32,10) TFCI CODE

| i | $M_{10}$ | $M_{11}$ | $M_{12}$ | $M_{13}$ | $M_{14}$ | $M_{15}$ | $M_{16}$ | $M_{17}$ | $M_{18}$ | $M_{19}$ |
|---|---|---|---|---|---|---|---|---|---|---|
| 0 | 1 | 0 | 0 | 0 | 0 | 1 | 0 | 0 | 0 | 0 |
| 1 | 0 | 1 | 0 | 0 | 0 | 1 | 1 | 0 | 0 | 0 |
| 2 | 1 | 1 | 0 | 0 | 0 | 1 | 0 | 0 | 0 | 1 |
| 3 | 0 | 0 | 1 | 0 | 0 | 1 | 1 | 0 | 1 | 1 |
| 4 | 1 | 0 | 1 | 0 | 0 | 1 | 0 | 0 | 0 | 1 |
| 5 | 0 | 1 | 1 | 0 | 0 | 1 | 0 | 0 | 1 | 0 |
| 6 | 1 | 1 | 1 | 0 | 0 | 1 | 0 | 1 | 0 | 0 |
| 7 | 0 | 0 | 0 | 1 | 0 | 1 | 0 | 1 | 1 | 0 |
| 8 | 1 | 0 | 0 | 1 | 0 | 1 | 1 | 1 | 1 | 0 |
| 9 | 0 | 1 | 0 | 1 | 0 | 1 | 1 | 0 | 1 | 1 |
| 10 | 1 | 1 | 0 | 1 | 0 | 1 | 0 | 0 | 1 | 1 |
| 11 | 0 | 0 | 1 | 1 | 0 | 1 | 0 | 1 | 1 | 0 |
| 12 | 1 | 0 | 1 | 1 | 0 | 1 | 0 | 1 | 0 | 1 |
| 13 | 0 | 1 | 1 | 1 | 0 | 1 | 1 | 0 | 0 | 1 |
| 14 | 1 | 1 | 1 | 1 | 0 | 1 | 1 | 1 | 1 | 1 |
| 15 | 1 | 0 | 0 | 0 | 1 | 1 | 1 | 1 | 0 | 0 |
| 16 | 0 | 1 | 0 | 0 | 1 | 1 | 1 | 1 | 0 | 1 |
| 17 | 1 | 1 | 0 | 0 | 1 | 1 | 1 | 0 | 1 | 0 |
| 18 | 0 | 0 | 1 | 0 | 1 | 1 | 0 | 1 | 1 | 1 |
| 19 | 1 | 0 | 1 | 0 | 1 | 1 | 0 | 1 | 0 | 1 |
| 20 | 0 | 1 | 1 | 0 | 1 | 1 | 0 | 0 | 1 | 1 |
| 21 | 1 | 1 | 1 | 0 | 1 | 1 | 0 | 1 | 1 | 1 |
| 22 | 0 | 0 | 0 | 1 | 1 | 1 | 0 | 1 | 0 | 0 |
| 23 | 1 | 0 | 0 | 1 | 1 | 1 | 1 | 1 | 0 | 1 |
| 24 | 0 | 1 | 0 | 1 | 1 | 1 | 1 | 0 | 1 | 0 |
| 25 | 1 | 1 | 0 | 1 | 1 | 1 | 1 | 0 | 0 | 1 |
| 26 | 0 | 0 | 1 | 1 | 1 | 1 | 0 | 0 | 1 | 0 |
| 27 | 1 | 0 | 1 | 1 | 1 | 1 | 1 | 1 | 0 | 0 |
| 28 | 0 | 1 | 1 | 1 | 1 | 1 | 1 | 1 | 1 | 0 |
| 29 | 1 | 1 | 1 | 1 | 1 | 1 | 1 | 1 | 1 | 1 |
| 30 | 0 | 0 | 0 | 0 | 0 | 1 | 0 | 0 | 0 | 0 |
| 31 | 0 | 0 | 0 | 0 | 1 | 1 | 1 | 0 | 0 | 0 |

COMBINATION IS QUADRATURE VECTOR OR ROW VECTOR OF WALSH MATRIX ($M_{10}$–$M_{15}$)

MASK CODE ($M_{16}$–$M_{19}$)

FIG. 6

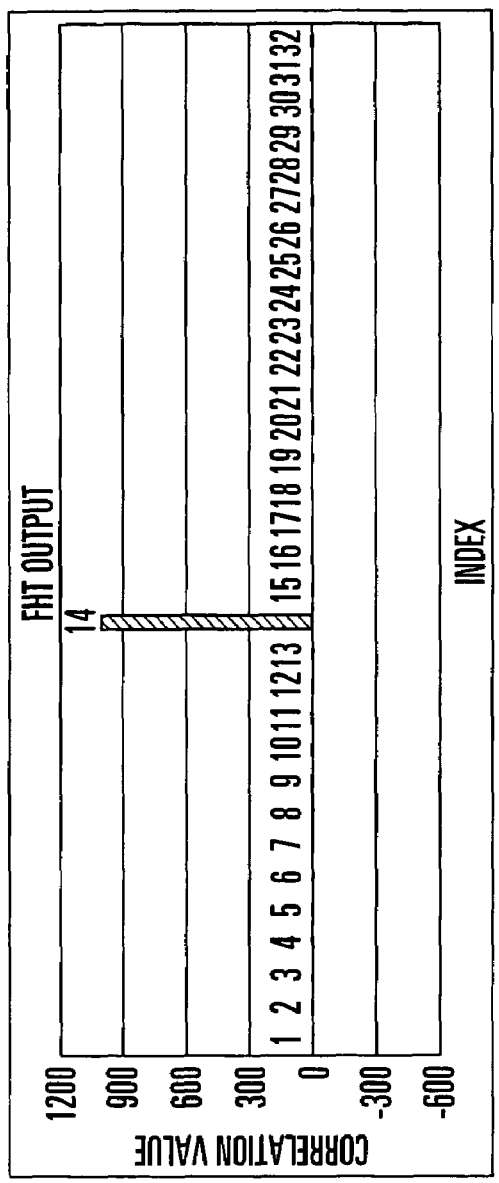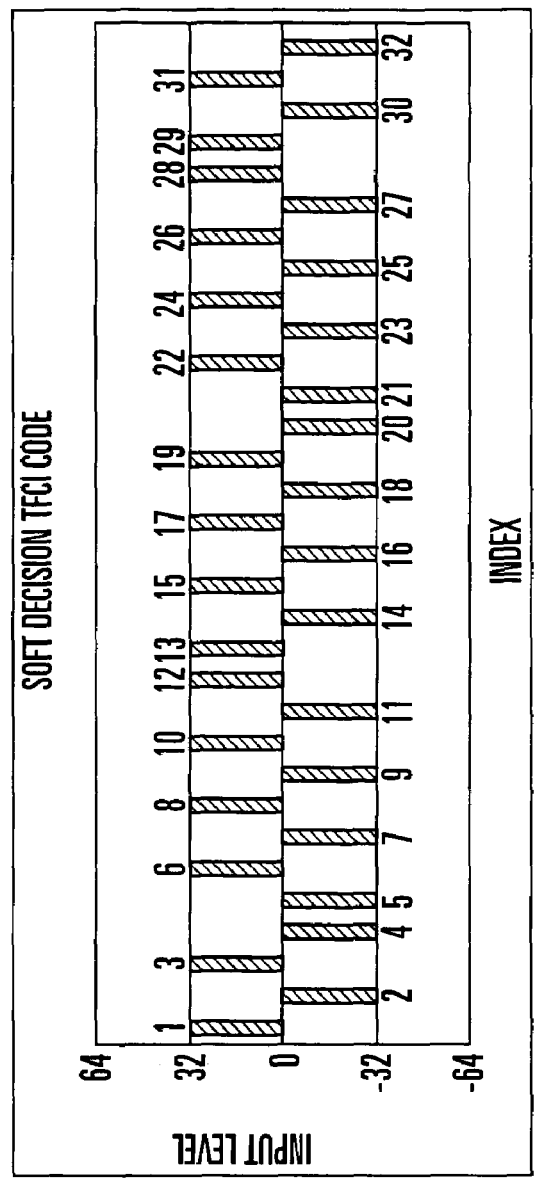
FIG.8A
FIG.8B

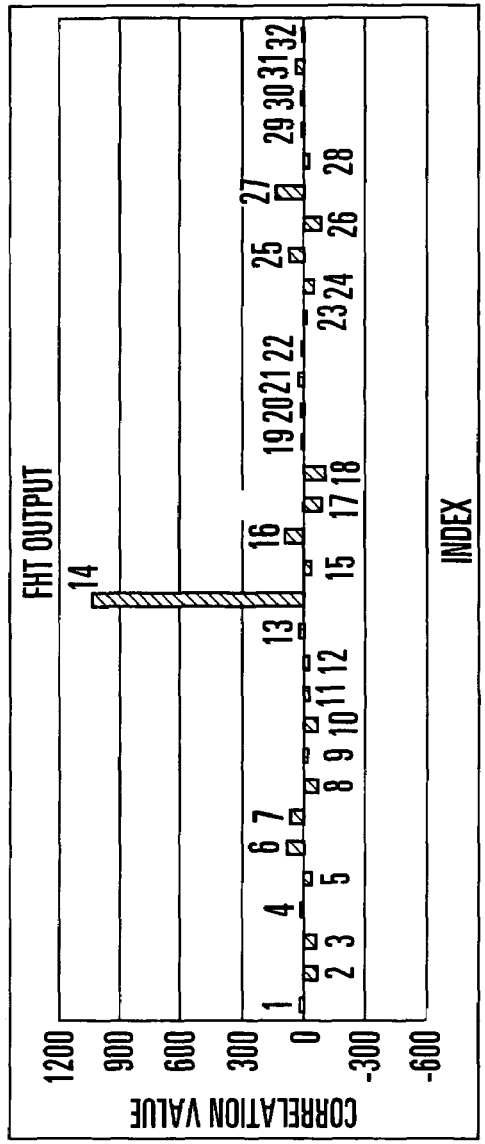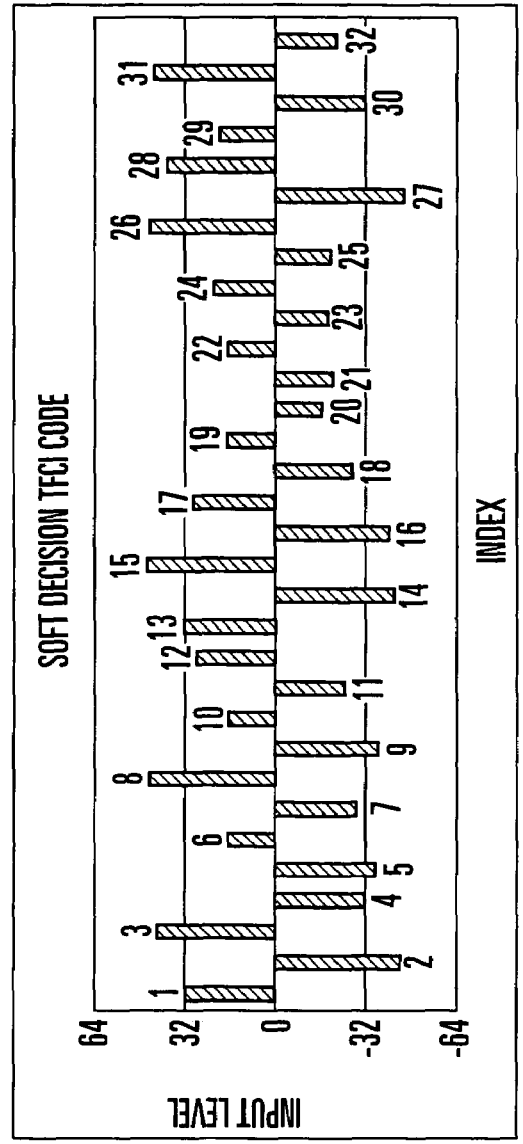
FIG.11A
FIG.11B

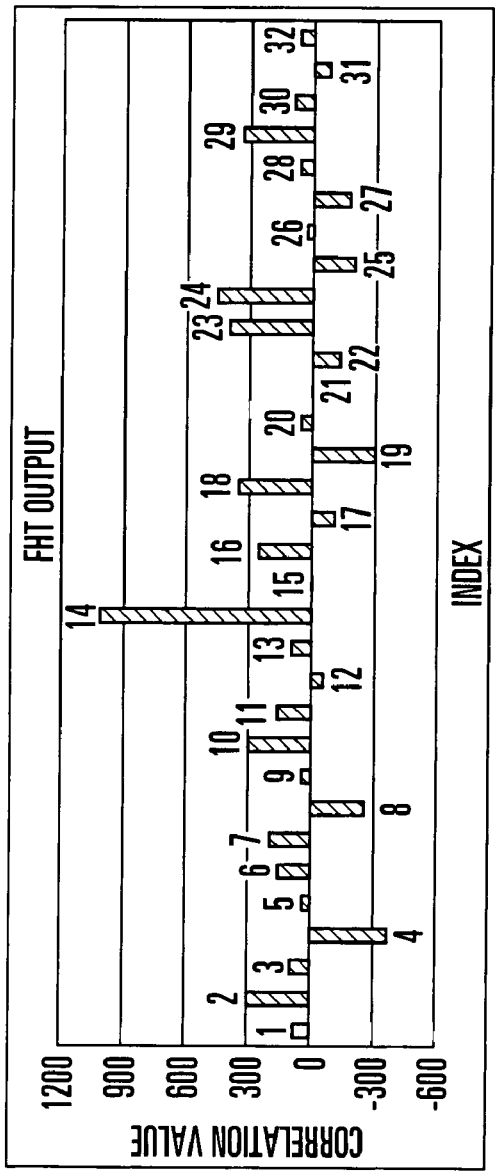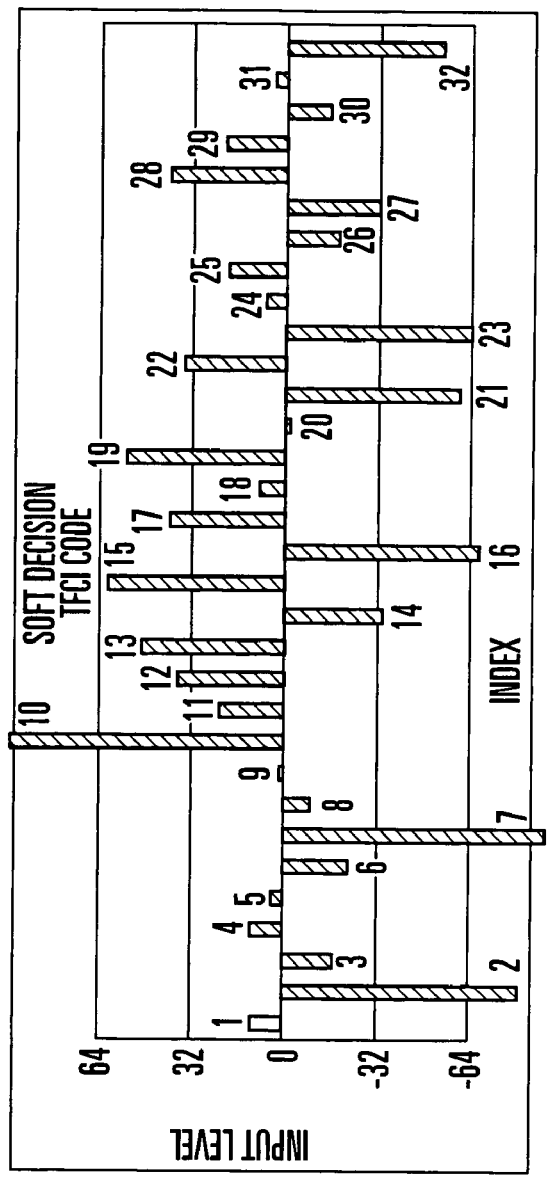
FIG. 14A
FIG. 14B

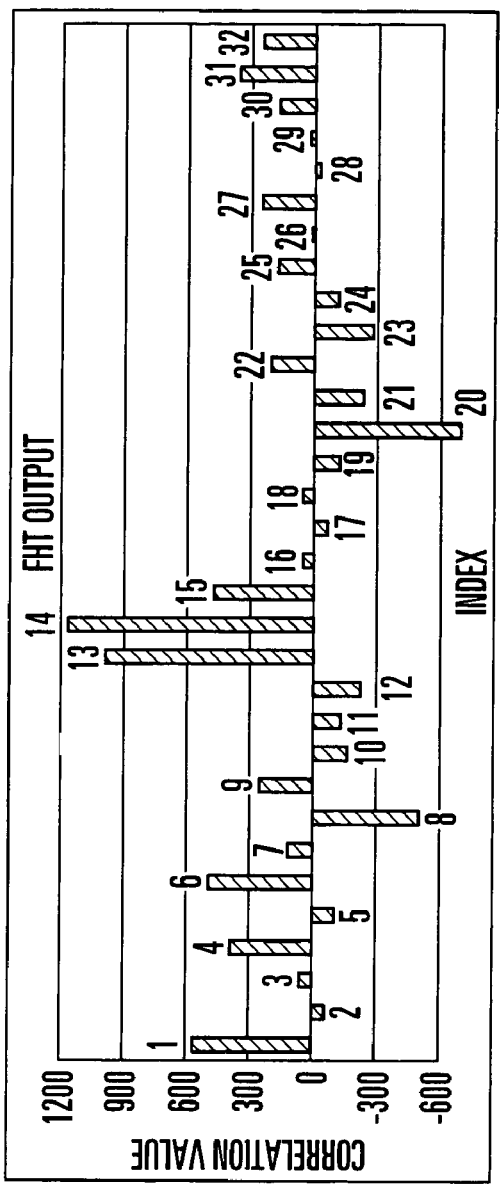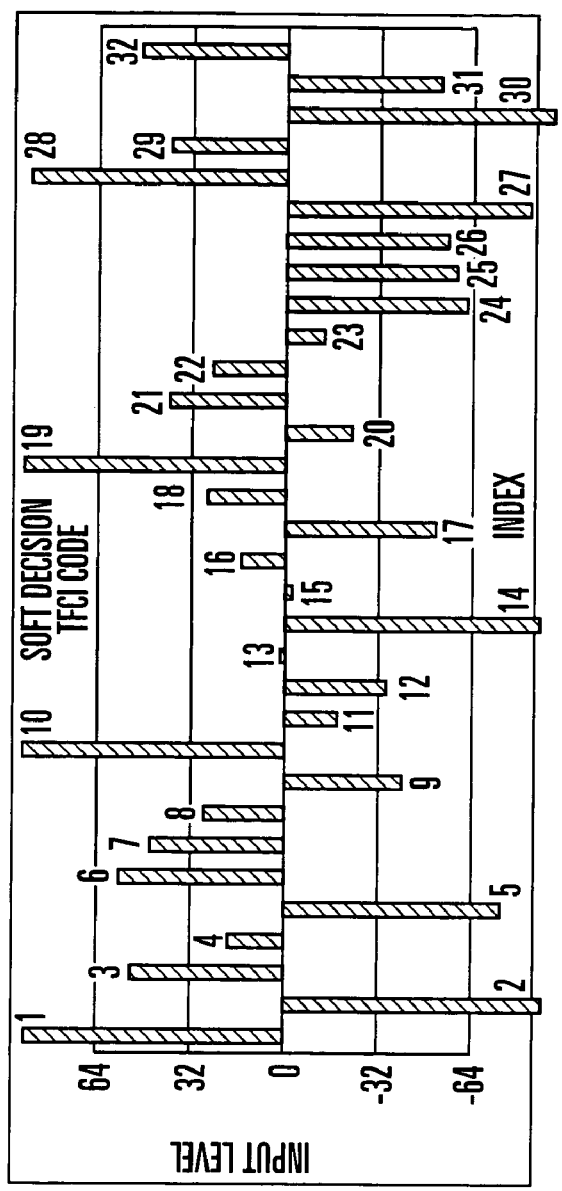
FIG.16A
FIG.16B

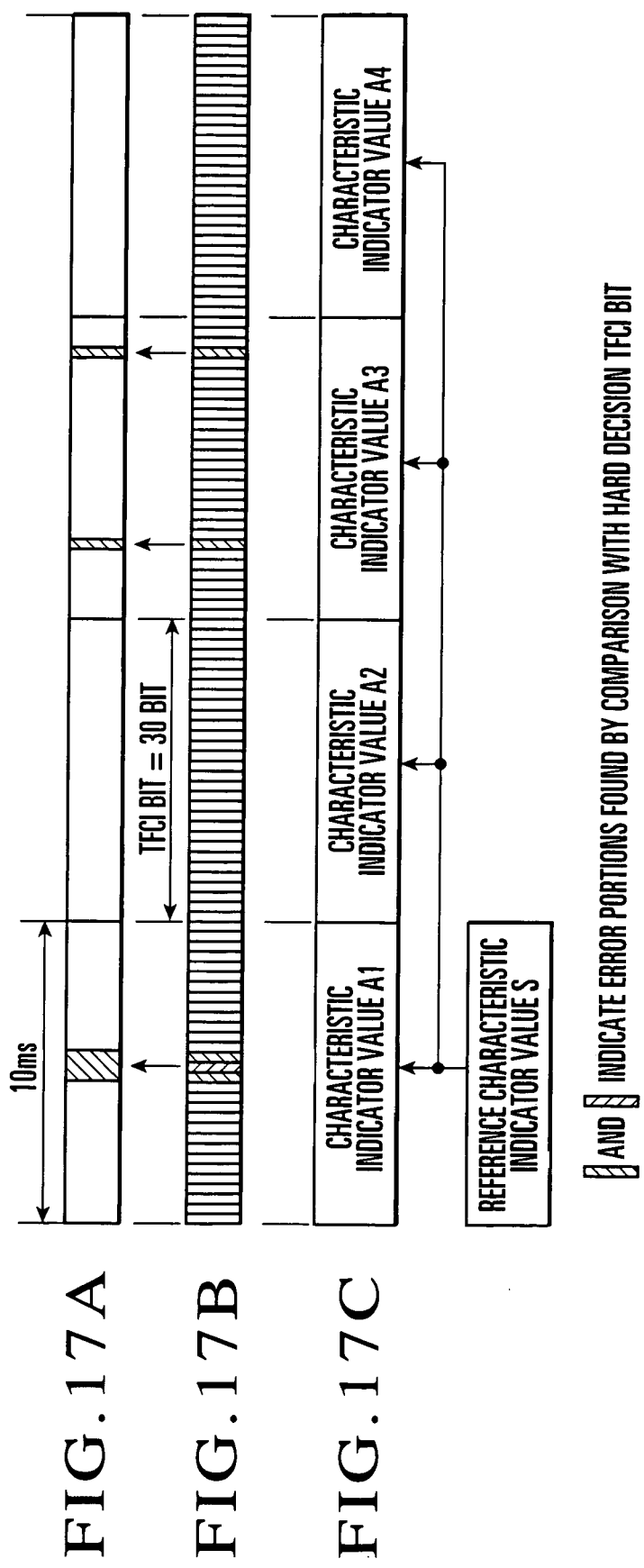

RADIO BASE STATION APPARATUS, DECODING APPARATUS USED THEREFOR WHICH USES TFCI DECODING CHARACTERISTICS, AND DECODING METHOD THEREFOR

BACKGROUND OF THE INVENTION

The present invention relates to a decoding apparatus which receives and decodes data on a dedicated physical control channel and data on a dedicated physical data channel, which are coded into a complex code of a single system which is transmitted as an uplink signal from a mobile unit to a base station in a 3rd generation cell phone system, a decoding method for the decoding apparatus, and a radio base station apparatus using the decoding apparatus.

A radio base station apparatus in a digital cell phone system such as a CDMA system is required to improve the reception characteristics (decoding characteristics) with respect to the necessary communication quality (SIR: Signal to Interference power Ratio) for each mobile station (user). This is because improving the decoding characteristics can save excessive transmission power control and minimize interference with other users. This has great influences on communication quality and channel capacity. A reception SIR is often measured by using a pilot bit on a dedicated control channel, which is used for closed loop transmission power control, maximum ratio combining in RAKE combining operation in CDMA, and the like.

As a radio base station apparatus in a next-generation (3rd generation) cell phone system, an apparatus is used, which decodes information coded according to TFCI (Transport Format Combination Indicator) written in specifications TS25.212 of 3GPP (3rd Generation Partnership Project) which is a standards institute. Various kinds of decoding techniques for such TFCI codes have been proposed (see, e.g., Japanese Patent Laid-Open No. 2002-26735 (p. 2, FIGS. 6 to 8) and Japanese Patent Laid-Open No. 2001-245359 (pp. 2-3, FIGS. 1 and 2).

Uplink dedicated physical channels (DPCHs) from mobile stations to a base station in a next-generation (3rd generation) cell phone system include a dedicated physical control channel (DPCCH) for transferring various kinds of control information including TFCI information and dedicated physical data channels (DPDCHs) for transferring user data. Data on these channels of a plurality of systems are respectively spread by different spreading codes and then modulated into a complex code (I+jQ) of a signal system to be transmitted to a base station through a radio link.

Therefore, data on a dedicated physical control channel and data on dedicated physical data channels which are decoded by the radio base station apparatus are exposed to the same radio wave environment on a radio link, and hence they are associated with each other in terms of error occurrence.

A code vector generated by coding TFCI information which is written in TS25.212 is basically a row vector of a Walsh matrix, i.e., a quadrature code. For this reason, when a TFCI value is to be decoded, the quadrature correlation characteristics can be used. The conventional TFCI decoding technique is, however, aimed at only decoding operation for obtaining TFCI information on a dedicated physical control channel, but is not designed to perform error data correction processing for a dedicated physical data channel by using the correlation characteristics obtained at that time.

SUMMARY OF THE INVENTION

It is, therefore, an object of the present invention to provide a radio base station apparatus which performs data correction by feeding back the TFCI decoding characteristics of a coded TFCI code on a dedicated physical control channel to a dedicated physical data channel, and can improve the reception characteristics, a decoding apparatus used therefor which uses the TFCI decoding characteristics, and a decoding method therefor.

In order to achieve the above object, according to the present invention, there is provided a decoding apparatus comprising reception means for receiving data on a dedicated physical control channel and data on a dedicated physical data channel, which are coded into a complex code of a single system which is to be transmitted as an uplink signal from a mobile unit to a base station in a 3rd generation cell phone system, TFCI decoding characteristic feedback means for determining TFCI decoding characteristics of a coded TFCI code on the dedicated physical control channel, and dedicated physical data channel correcting means for performing data correction for the dedicated physical data channel on the basis of a determination result on the TFCI decoding characteristics.

BRIEF DESCRIPTION OF THE DRAWINGS

FIG. 6 is a view for explaining the operation of a data bit interchanging section in FIG. 2;

FIG. 8A is a graph showing the input/output characteristics of the fast Hadamard transform section in FIG. 2, and more specifically, correlation values after Hadamard transform with a noise level of ±0;

FIG. 8B is a graph showing the input/output characteristics of the fast Hadamard transform section in FIG. 2, and more specifically, input values before Hadamard transform with a noise level of ±0;

FIG. 11A is a graph showing the input/output characteristics of the fast Hadamard transform section in FIG. 2, and more specifically, correlation values after Hadamard transform with a noise level of ±16;

FIG. 11B is a graph showing the input/output characteristics of the fast Hadamard transform section in FIG. 2, and more specifically, input values before Hadamard transform with a noise level of ±16;

FIG. 14A is a graph showing the input/output characteristics of the fast Hadamard transform section in FIG. 2, and more specifically, correlation values after Hadamard transform with a noise level of ±64;

FIG. 14B is a graph showing the input/output characteristics of the fast Hadamard transform section in FIG. 2, and more specifically, input values before Hadamard transform with a noise level of ±64;

FIG. 16A is a graph showing the input/output characteristics of the fast Hadamard transform section in FIG. 2, and more specifically, correlation values after Hadamard transform with a noise level of ±96;

FIG. 16B is a graph showing the input/output characteristics of the fast Hadamard transform section in FIG. 2, and more specifically, input values before Hadamard transform with a noise level of ±96;

FIG. 17A is a view showing the state of a dedicated physical data channel (DPDCH) frame;

FIG. 17B is a view showing the state of the frame of the TFCI bit portion of a dedicated physical control channel (DPCCH); and FIG. 17C is a view showing the state of the frame of characteristic indicator values A calculated from reception TFCI bits.

DESCRIPTION OF THE PREFERRED EMBODIMENTS

An outline of the present invention will be described first. The present invention is directed to an apparatus (radio base station apparatus) using a method of decoding information coded according to TFCI (Transport Format Combination Indicator) written in specifications TS25.212 of 3GPP (3rd Generation Partnership Project) which is a standards institute for next-generation (third generation) cell phone systems.

Uplink dedicated physical channels (DPCHs) from mobile stations to base stations in a next-generation cell phone system (W-CDMA: Wideband-Code Division Multiple Access) include a dedicated physical control channel (DPCCH) for transferring various kinds of control information including TFCI (Transport Format Combination Indicator) information and pilot information and a dedicated physical data channel (DPDCH) for transferring user data. Data on these channels of a plurality of systems are spread by different spreading codes and then modulated into a complex code of a single system (I+jQ: in-phase components=I axis, quadrature phase components=Q axis) (dedicated physical control channel data is assigned to Q, and dedicated physical data channel data are sequentially assigned to I and Q). This complex code is subjected to proper modulation processing on a radio interface and transmitted to a base station.

The base station (radio base station apparatus) separates the complex code received from each mobile station into dedicated physical control channel data and dedicated physical data channel data, and decodes each data.

A code vector generated by coding TFCI information which is described in TS25.212 is basically a row vector of a Walsh matrix, i.e., a quadrature vector code. For this reason, when a TFCI value on a dedicated physical control channel is to be decoded, its quadrature correlation characteristics can be used.

In the present invention, therefore, data correction is performed by feeding back the TFCI decoding characteristics of a coded TFCI code on a dedicated physical control channel to a dedicated physical data channel, thereby improving the reception characteristics. The decoding characteristics of an error correcting section are improved by this feedback method using TFCI characteristics. Improving the decoding characteristics can suppress a target SIR (Signal To Interference Ratio) that satisfies a necessary BER (Bit Error Ratio) or BLER (Block Error Ratio) which is called transmission power control, and hence can suppress the transmission power required to maintain necessary communication quality. This can also reduce interference with other users to make an improvement in channel capacity.

An embodiment of the present invention will be described in detail next with reference to the accompanying drawings.

Figure 3:
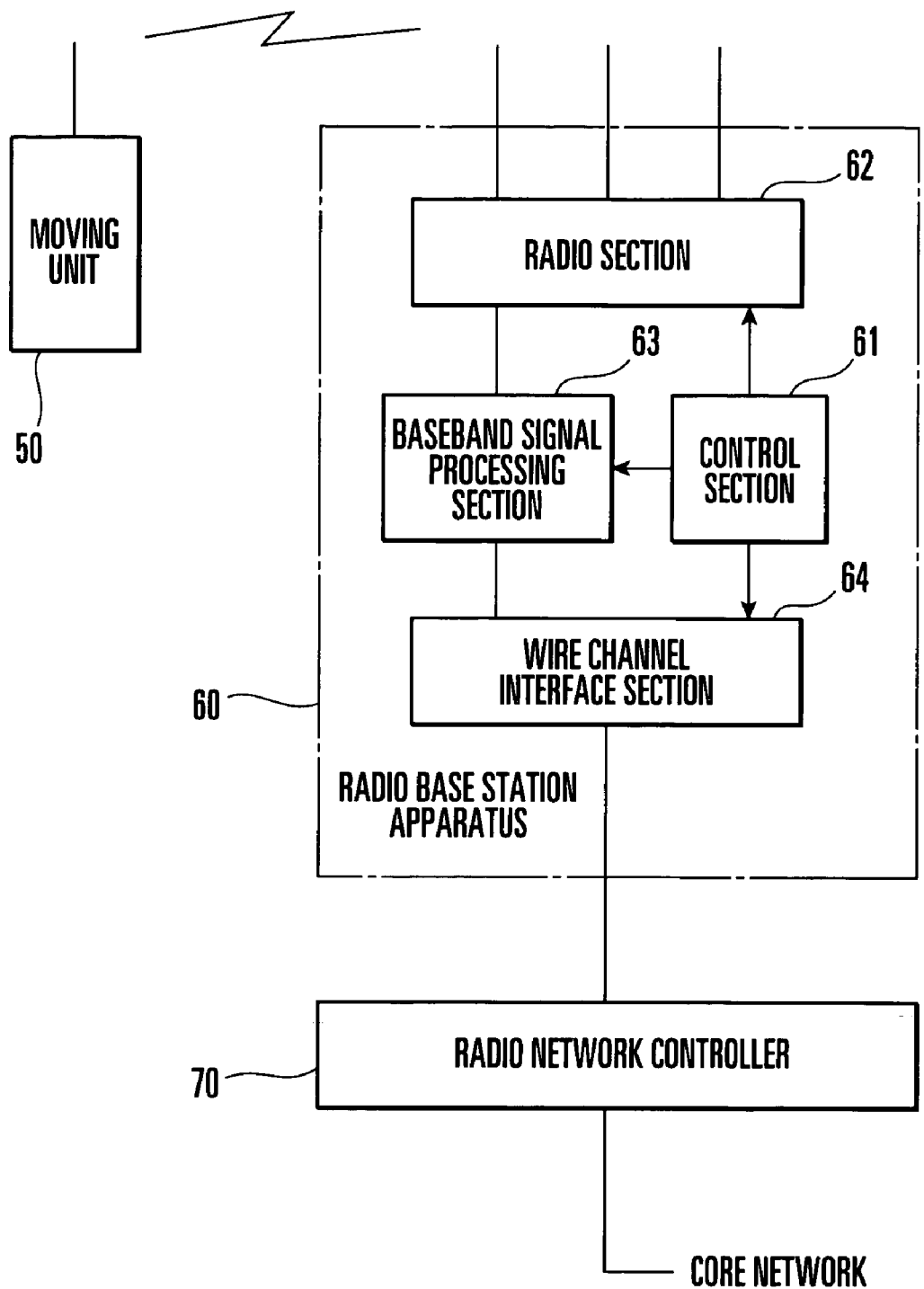
FIG. 3 is a block diagram showing the arrangement of an example of a next-generation (3rd generation) cell phone system to which the present invention is applied.

FIG. 3 shows the arrangement of an example of a next-generation (third generation) cell phone system to which the present invention is applied. Referring to FIG. 3, this cell phone system includes a moving unit 50 which is carried by a user and moved to an arbitrary place, a radio base station apparatus 60 which transmits/receives various kinds of channel signals to/from the moving units 50 existing in the radio service area managed by the self station by radio (downlinks and uplinks), and a radio network controller 70 which controls the base station apparatuses 60 connected to a core network to control communication between the moving units 50 and other parties.

The radio base station apparatus 60 includes a control section 61 which controls the overall apparatus, a radio section 62 which transmits/receives radio carrier frequency signals to/from the moving unit 50 through an antenna, a baseband signal processing section 63 which performs baseband processing of signals (user data) which are transmitted/received to/from the moving unit 50 through the radio section 62, and a wire channel interface section 64 which performs interface control on a wire channel between the home apparatus and the radio network controller 70 and transmits/receives control signals to/from the control section 61 and signals (user data) to/from the baseband signal processing section 63.

Figure 4:
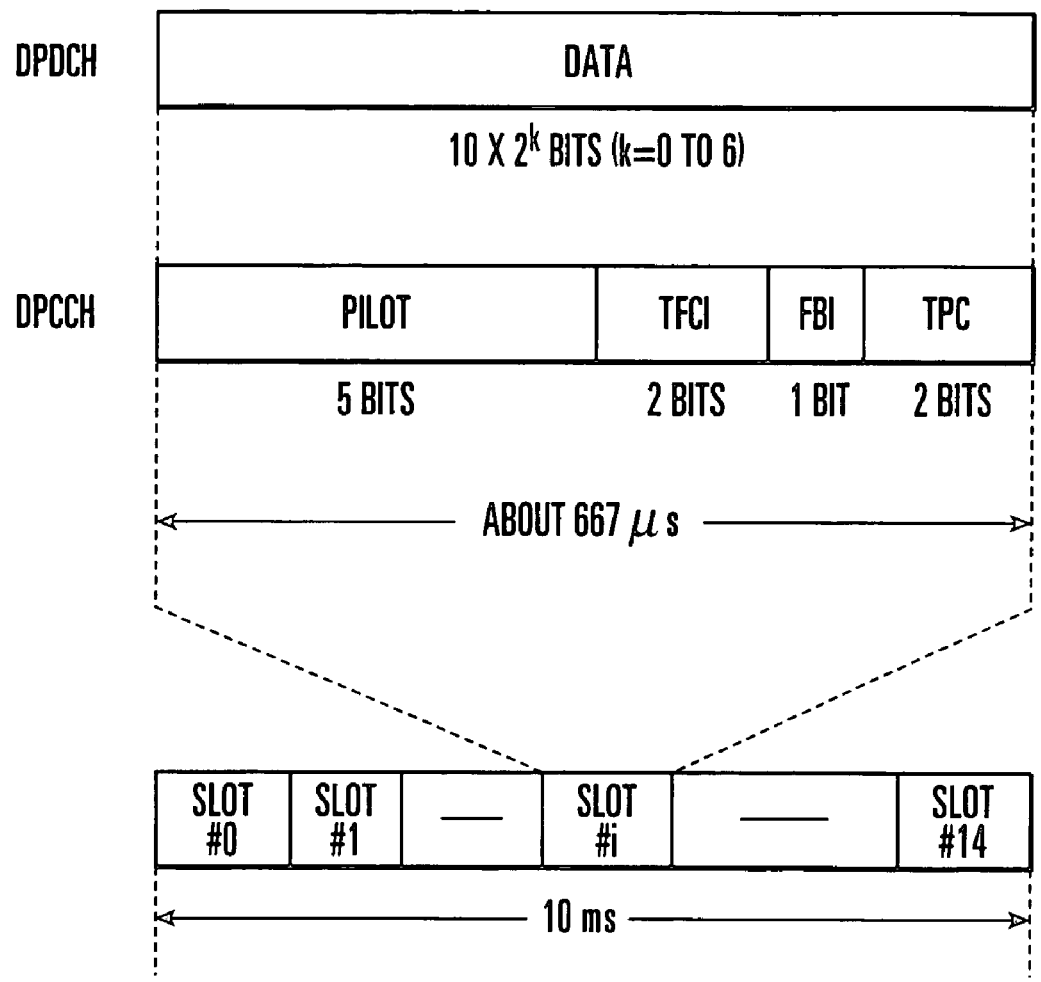
FIG. 4 is a view showing the radio frame structure of a dedicated physical channel on an uplink.

FIG. 4 shows an example of the radio frame structure of a dedicated physical channel (DPCH=DPCCH (Dedicated Physical Control Channel) and DPDCH (Dedicated Physical Data Channel)) on an uplink from the moving unit 50 to the radio base station apparatus 60. One dedicated physical control channel (DPCCH) for the transfer of control information always exists in any connection form, whereas one or more or no dedicated physical data channels (DPDCHs) may exist depending on the connection form. The DPCCH and DPDCHs are I/Q-multiplexed.

Each radio frame (10 ms) is divided into 15 slots (#0 to #14), and each slot is made up of 2,560 chips. The number of symbol bits per slot is determined by a parameter k corresponding to a spreading factor (SF=ratio of chip rate to symbol rate) (SF=$256/2^k$ where k=0 to 6).

For example, in the case of slot format 2, the SF of a dedicated physical control channel (DPCCH) is a fixed value (=256), and one slot is fixed to 10 bits. The slot is broken down into five bits for pilot information (pilot), two bits for transport format combination indicator information (TFCI), one bit for feedback information (FBI), and two bits for transmission power control command (TPC).

"Pilot" is known bit pattern information for channel estimation in synchronous detection.

"TFCI (Transport Format Combination Indicator)" is information indicating how many transport channels are multiplexed on a reception frame on an uplink DPDCH and which transport format is used by each transport channel.

FBI information includes information for control on closed loop transmission diversity or site selection diversity.

Figure 5:
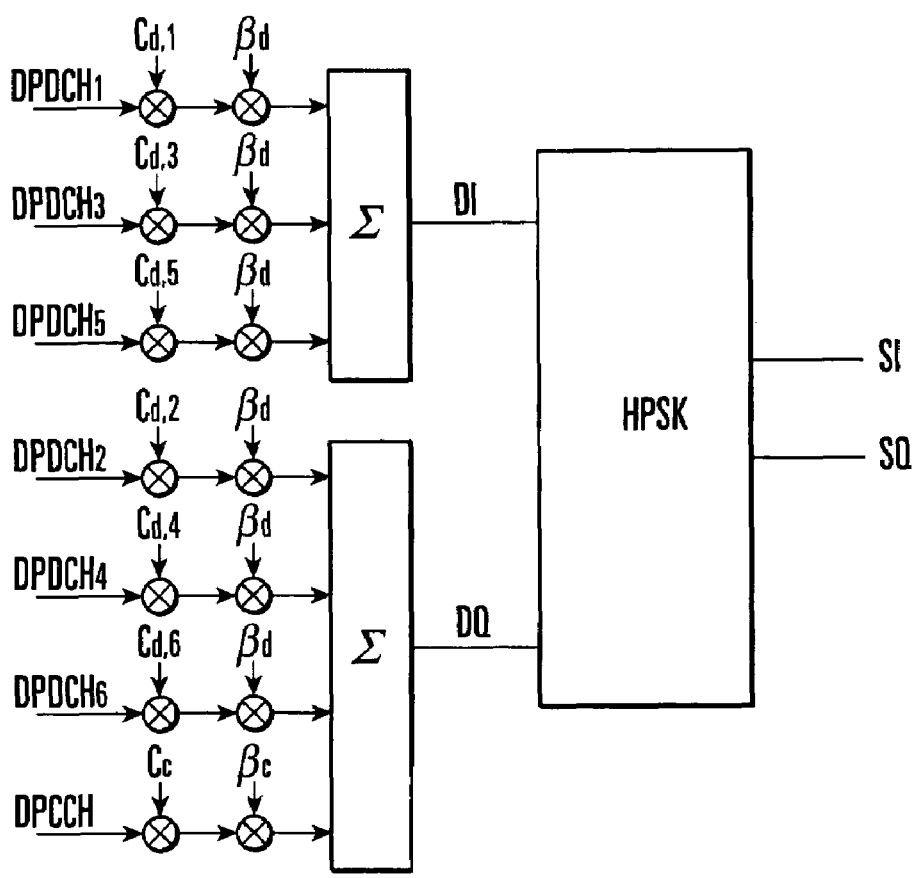
FIG. 5 is a view for explaining an example of I/Q multiplexing for an uplink dedicated physical control channel and dedicated physical data channels.

FIG. 5 explains how data on an uplink dedicated physical control channel (DPCCH) and dedicated physical data channels (DPDCHs) are I/Q-multiplexed by spreading/modulation processing in the moving unit 50.

Referring to FIG. 5, data of a plurality of systems on one dedicated physical control channel (DPCCH) and up to six (any one of n=0 to 6) dedicated physical data channels (DPDCHs) can be simultaneously transmitted. Note that these data are expressed as a real-number system. That is, the logical value (binary logical value) "0" is mapped to the real number +1, and the logical value "1" to the real number −1.

DPCCH data is spread by a channelization code Cc, and weighted by a gain factor βc. The resultant data is input to a Q signal adder. The nth (n=1 to 6) DPDCH data are spread by corresponding channelization codes Cd and n and weighted by a gain factor βd. Of the resultant data, odd-numbered data (n=1, 3, 5) are input to an I signal adder, and even-numbered data (n=2, 4, 6) to the Q signal adder.

An I signal adder output DI and Q signal adder output DQ are subjected to HPSK (Hybrid Phase Shift Keying) scrambling by a special complex function in an HPSK modulator while being associated with each other. The resultant data is output as a 1-system HPSK complex code (in-phase component SI, quadrature component SQ). This HPSK spreading modulation scheme can reduce the peak power of a transmission signal by decreasing the probability of 180° phase shift as compared with the QPSK spreading modulation scheme. The output signals (SI, SQ) from the HPSK modulator modulate a radio frequency carrier, and the modulated signal is transmitted to the radio base station apparatus 60.

Figure 1:
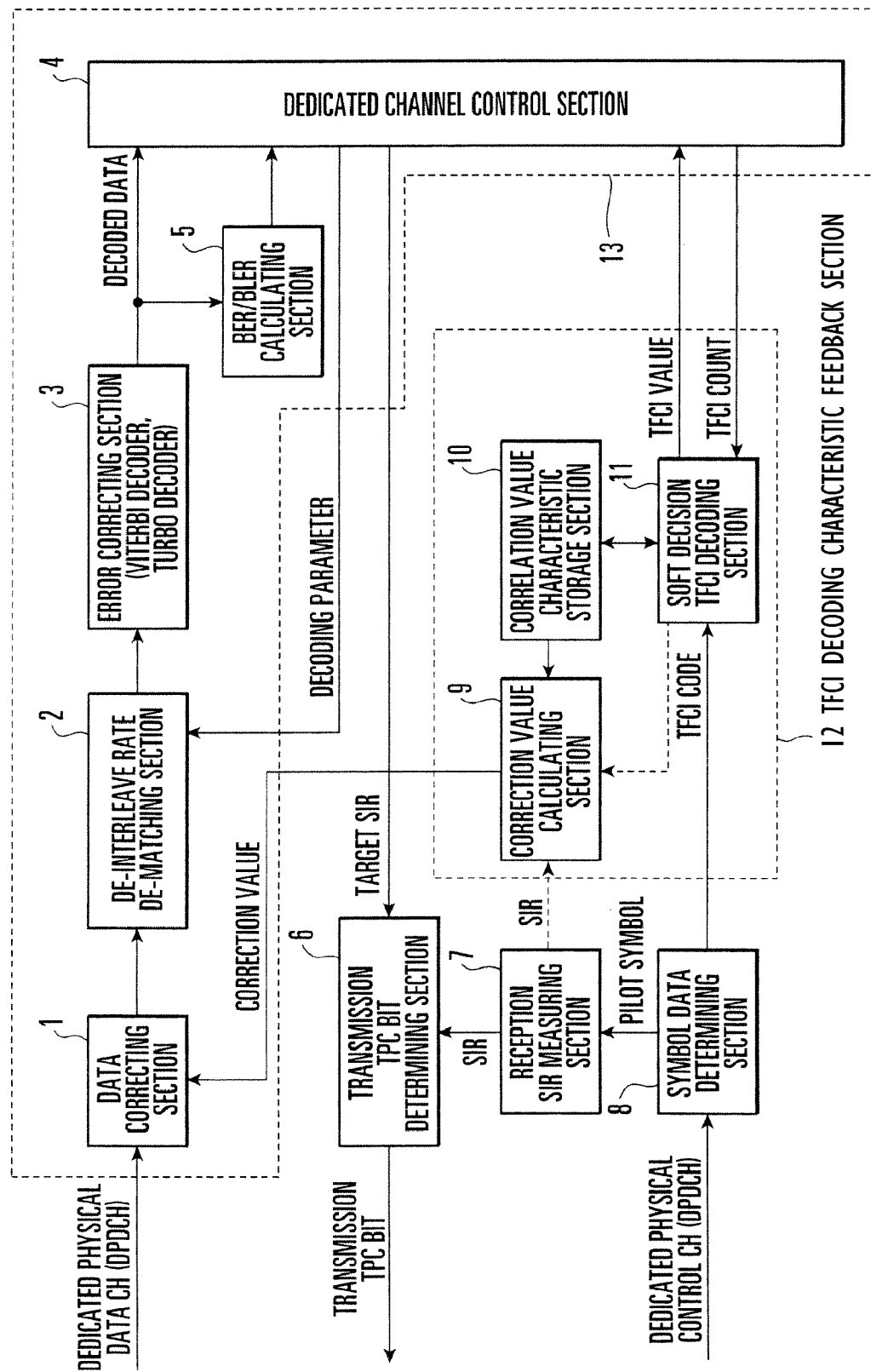
FIG. 1 is a block diagram showing a decoding apparatus according to an embodiment of the present invention.

FIG. 1 shows the arrangement of a decoding apparatus according to an embodiment of the present invention. This decoding apparatus is incorporated in the baseband signal processing section 63 of the radio base station apparatus 60 shown in FIG. 3. Although not shown, dedicated physical control channel (DPCCH) data and dedicated physical data channel (DPDCH) data on a radio frequency carrier received from the moving unit 50 are separated by a proper circuit provided on the input stage of the decoding apparatus.

Referring to FIG. 1, this decoding apparatus includes a data correcting section 1 which processes the correction value fed back from the decoding characteristics of a control channel with respect to dedicated physical data channel (DPDCH) data received from a mobile unit, a de-interleave rate de-matching section 2 which performs channel decoding of the coded dedicated physical data channel data on the basis of a decoding parameter, an error correcting section (Viterbi decoder/turbo decoder) 3, a BER/BLER calculating section 5 which measures the bit error rate and block error rate of the decoded data, a dedicated channel control section 4 which has a function of notifying a TFCI count in accordance with a dedicated channel service, a function of notifying a decoding parameter from the obtained TFCI value, and a function of notifying a transmission TPC bit determining section 6 of a target SIR from the communication quality obtained from the BER/BLER calculating section 5, a symbol data determining section 8 which extracts and separates a pilot symbol and TFCI code from dedicated physical control channel (DPCCH) data, a reception SIR measuring section 7 which calculates a reception SIR from the pilot symbol, the transmission TPC bit determining section 6 which performs closed loop transmission power control in accordance with the target SIR and reception SIR, a soft decision TFCI decoding section 11 which TFCI-decodes a TFCI code, and a correlation value characteristic storage section 10 and correction value calculating section 9 which are used to calculate a correction value. Note that the correction value calculating section 9, correlation value characteristic storage section 10, and soft decision TFCI decoding section 11 constitute a TFCI decoding characteristic feedback section 12. The data correcting section 1, de-interleave rate de-matching section 2, error correcting section 3, dedicated channel control section 4, and BER/BLER calculating section 5 constitute a dedicated physical data channel correcting section 13.

Figure 2:
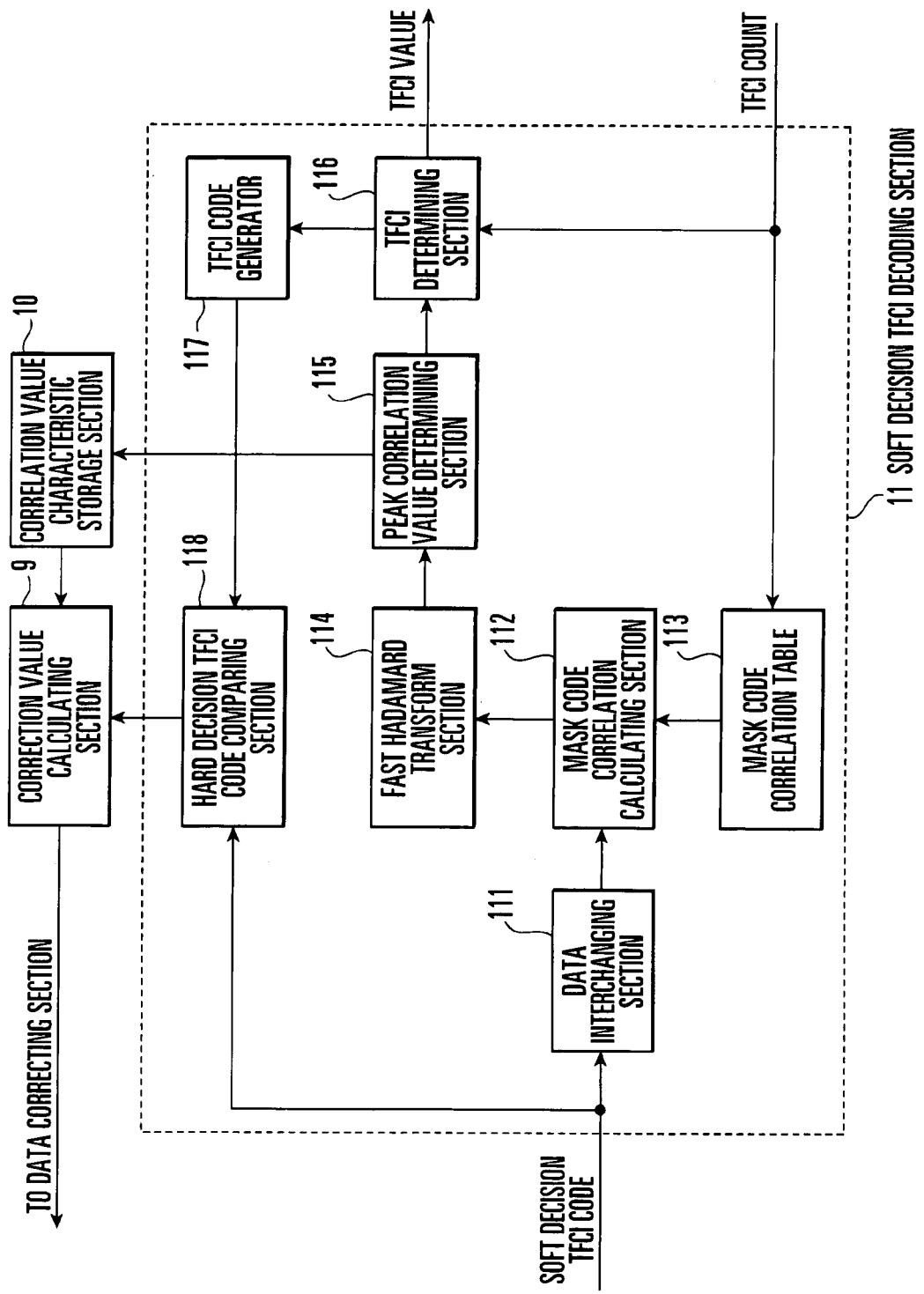
FIG. 2 is a block diagram showing the detailed arrangement of a TFCI decoding characteristic feedback section in FIG. 1.

FIG. 2 shows the detailed arrangement of the TFCI decoding characteristic feedback section 12 in FIG. 1. Referring to FIG. 2, the TFCI decoding characteristic feedback section 12 includes, in the soft decision TFCI decoding section 11, a data interchanging section 111 which inputs a reception TFCI code to a fast Hadamard transform section 114, a mask code correlation table 113 which is a code table having 16 combinations of mask codes (Mi, 6, Mi, 7, Mi, 8, Mi, 9 in FIG. 6) obtained by mod2 addition, a mask code correlation calculating section 112 which calculates the correlation between an output code from the data interchanging section 111 and the mask code correlation table 113, the fast Hadamard transform section 114 which performs Hadamard transform of an input code, a peak correlation value determining section 115 which determines the absolute peak value of Hadamard-transformed data, performs positive/negative determination on the peak value, and determines its index, a TFCI determining section 116 which determines a TFCI value from the determination result, a TFCI code generator 117 which generates a corresponding TFCI code from the obtained TFCI value by the method written in TS25.212, and a hard decision TFCI code comparing section 118 which compares the TFCI code generated by the TFCI code generator 117 with the TFCI code input to the soft decision TFCI decoding section 11 to determine the presence/absence of an error.

The TFCI decoding characteristic feedback section 12 further includes the correlation value characteristic storage section 10 which holds the correlation value characteristics obtained by the fast Hadamard transform section 114, and the correction value calculating section 9 which calculates a correction value from the information obtained from the correlation value characteristic storage section 10 and the information obtained from the hard decision TFCI code comparing section 118.

Operation of the present invention will be described next.

The data flow in the decoding apparatus will be described first on the basis of the TFCI coding method (see Coding of Transport-Format-Combination Indicator) described in TS25.212 of 3GPP and its characteristics.

Although not shown in FIGS. 1 and 2, the transmitting side (i.e., the moving unit 50) codes TFCI information bits (10 bits) a9, . . . , a0 into 32-bit data b0 to b31 according to $$b_i = \sum_{n=0}^{9} (a_n \times M_{i,n}) \bmod 2 \quad (1)$$

In this case, for Mi and n, refer to Basis sequences for (32, 10) TFCI code shown in FIG. 6. On the transmitting side, this coded TFCI code is mapped to DPCCH data and spread.

On the receiving side (i.e., the radio base station apparatus 60), the DPCCH data after soft decision operation of despreading the received signal is separated into a pilot symbol and a TFCI code by the symbol data determining section 8. The separated soft decision TFCI code is subjected to bit interchanging processing in the data interchanging section 111. The resultant data is input to the mask code correlation calculating section 112.

As shown in FIG. 6, the data interchanging section 111 interchanges/inserts i=30 before i=0, and i=31 between i=14 and i=15, thereby making Mi, 0, Mi, 1, Mi, 2, Mi, 3, Mi, 4 become a row vector of the 32nd-order Walsh quadrature matrix.

The mask code correlation calculating section 112 performs necessary correlation calculation by performing correlation processing for the TFCI code having undergone bit interchanging in accordance with a notified TFCI count, and inputs the resultant code to the fast Hadamard transform section 114. In this case, only a code used for correlation calculation is selected from the mask code correlation table 113 in accordance with the TFCI count and input to the mask code correlation calculating section 112.

If the TFCI count notified from the dedicated channel control section 4 is 64 or less, since the code "Mi, 6, Mi, 7, Mi, 8, Mi, 9" irrelevant to a Walsh quadrature vector has not been used, TFCI decoding can be performed by only Hadamard transform and positive/negative determination on the correlation peak. In this case, therefore, the mask code correlation calculating section 112 is not operated, and the output data processed by the data interchanging section 111 is input to the fast Hadamard transform section 114.

If the TFCI count notified from the dedicated channel control section 4 is 65 or more, the code "Mi, 6, Mi, 7, Mi, 8, Mi, 9" may have been used. This code "Mi, 6, Mi, 7, Mi, 8, Mi, 9" is called a mask code, which is a random code that is not quadrature to a Walsh quadrature vector. The mask code correlation table 113 obtained by mod2 addition (EX-OR) using combinations (16 combinations) of Mi, 6, Mi, 7, Mi, 8, Mi, 9 is held in advance. The code having undergone data interchanging in the data interchanging section 111 is correlated with the mask code correlation table 113 in advance. The resultant code is then input to the fast Hadamard transform section 114.

If the TFCI count notified from the dedicated channel control section 4 is 65 or more and 128 or less, only two combinations of the presence/absence (a6=0, 1) of Mi, 6 are selected from the mask code correlation table 113. If the TFCI count is 129 or more and 256 or less, only four combinations of the presence/absence (a6=0, 1, a7=0, 1) of Mi, 6 Mi, 7 are selected from the mask code correlation table 113. If the TFCI is 257 or more and 512 or less, only eight combinations of presence/absence (a6=0, 1, a7=0, 1, a8=0, 1) of Mi, 6, Mi, 7, Mi, 8 and 16 combinations of presence/absence (a6=0, 1, a7=0, 1, a8=0, 1, a9=0, 1) of Mi, 6, Mi, 7, Mi, 8, Mi, 9 are selected from the mask code correlation table 113. The mask code correlation calculating section 112 correlates these combinations with the data output from the data interchanging section 111. The resultant data are input to the fast Hadamard transform section 114.

This operation allows to use only one fast Hadamard transform section 114, and wasteful computation can be avoided by controlling the mask code correlation calculating section 112 in accordance with a notified TFCI count.

The fast Hadamard transform section 114 obtains correlation values with the Walsh quadrature vector. This is because the code bi generated by mod2 addition of 32 combinations of Mi, 0, Mi, 1, Mi, 2, Mi, 3, Mi, 4, which are combinations of n=0 to 4 in equation (1), also becomes a row vector of a 32nd-order Walsh quadrature matrix. Therefore, a TFCI value can be calculated with a smaller computation amount by using the fast Hadamard transform section 114.

Figure 7:
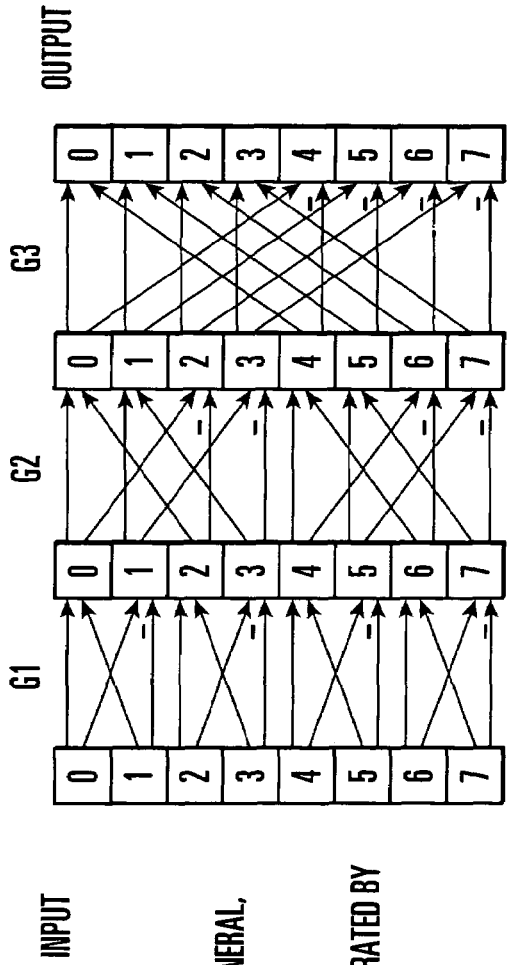
FIG. 7 is a view for explaining the operation of a fast Hadamard transform section in FIG. 2.
Figure 9A:
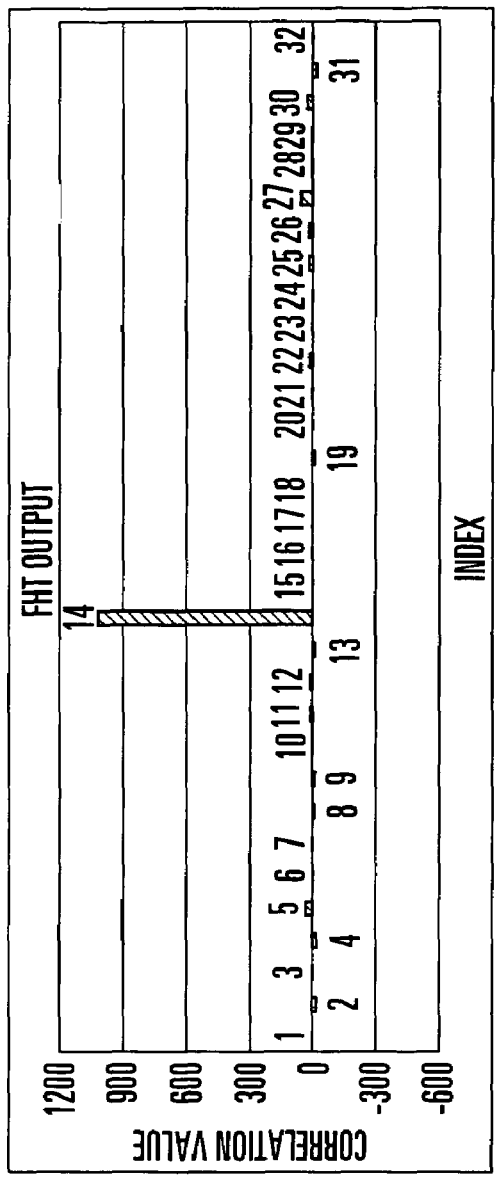
FIG. 9A is a graph showing the input/output characteristics of the fast Hadamard transform section in FIG. 2, and more specifically, correlation values after Hadamard transform with a noise level of ±4.
Figure 9B:
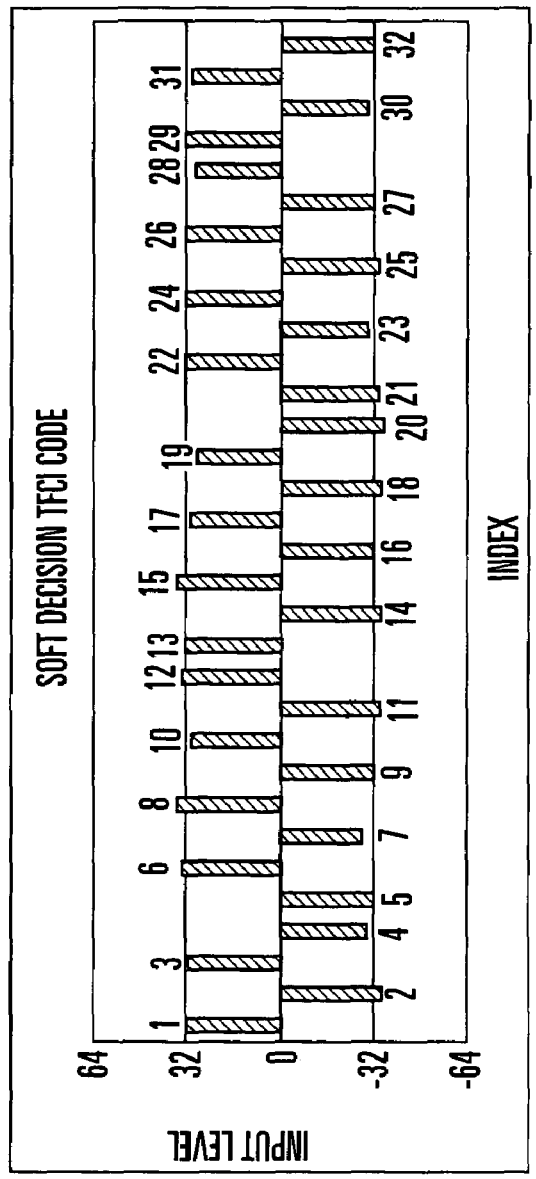
FIG. 9B is a graph showing the input/output characteristics of the fast Hadamard transform section in FIG. 2, and more specifically, input values before Hadamard transform with a noise level of ±4.
Figure 10A:
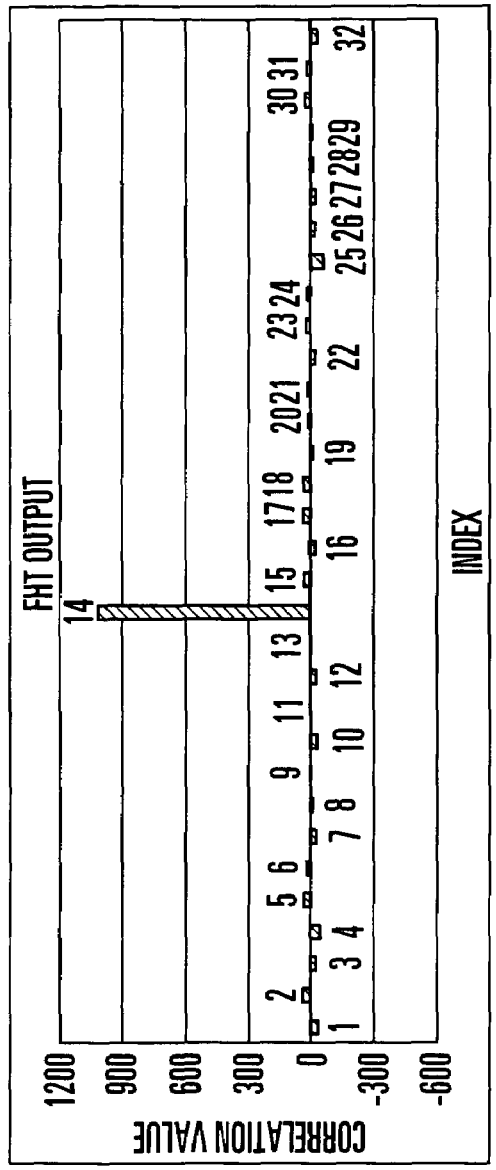
FIG. 10A is a graph showing the input/output characteristics of the fast Hadamard transform section in FIG. 2, and more specifically, correlation values after Hadamard transform with a noise level of ±8.
Figure 10B:
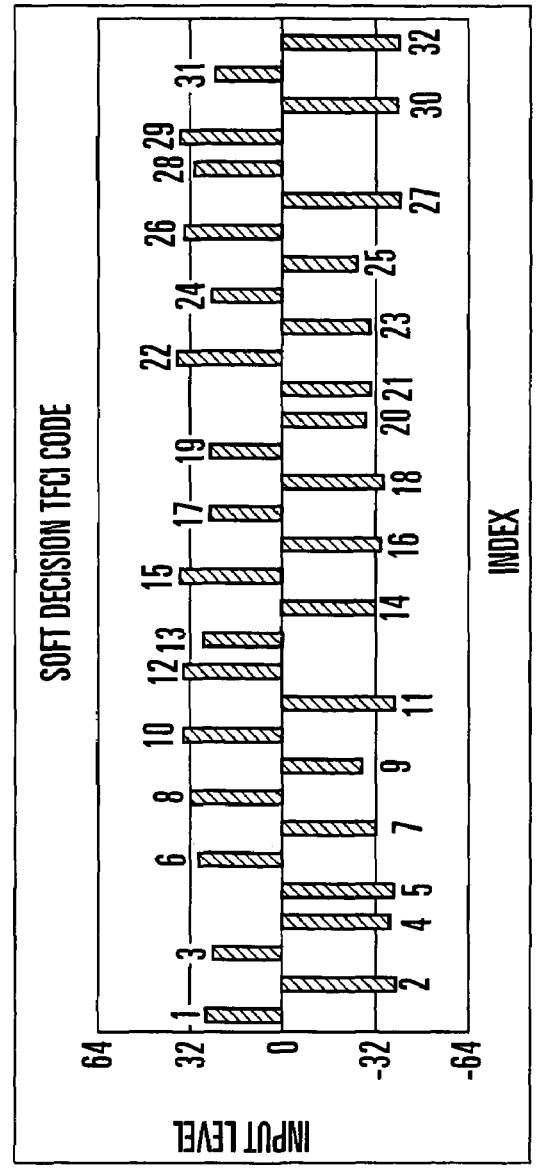
FIG. 10B is a graph showing the input/output characteristics of the fast Hadamard transform section in FIG. 2, and more specifically, input values before Hadamard transform with a noise level of ±8.
Figure 12A:
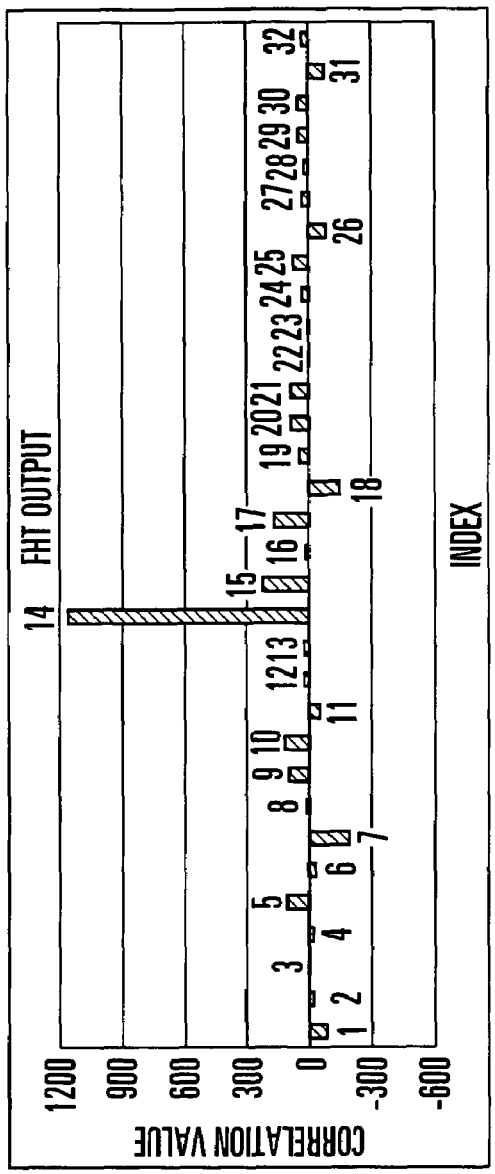
FIG. 12A is a graph showing the input/output characteristics of the fast Hadamard transform section in FIG. 2, and more specifically, correlation values after Hadamard transform with a noise level of ±32.
Figure 12B:
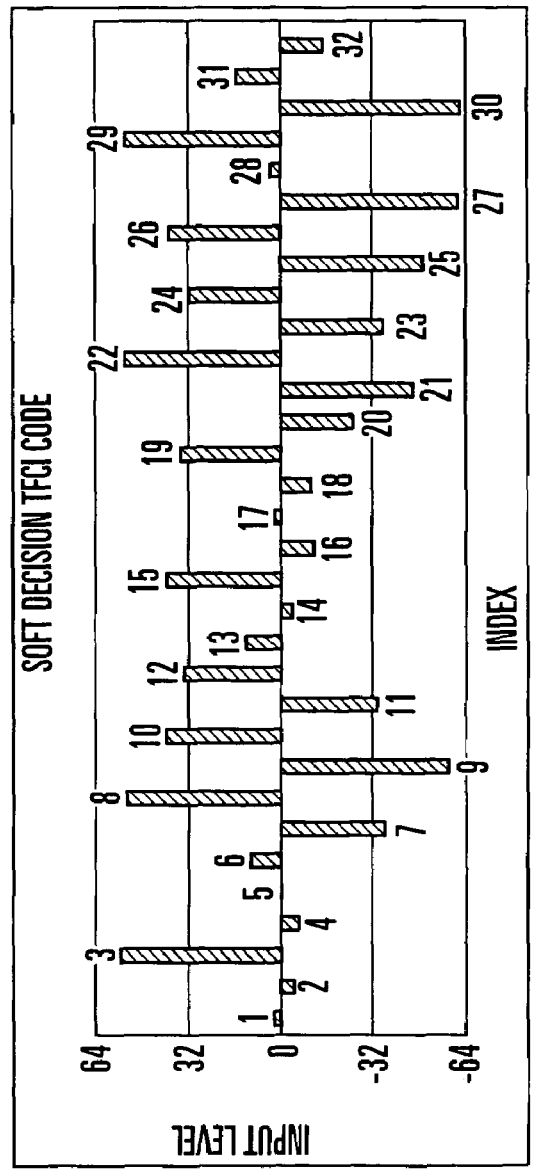
FIG. 12B is a graph showing the input/output characteristics of the fast Hadamard transform section in FIG. 2, and more specifically, input values before Hadamard transform with a noise level of ±32.
Figure 13A:
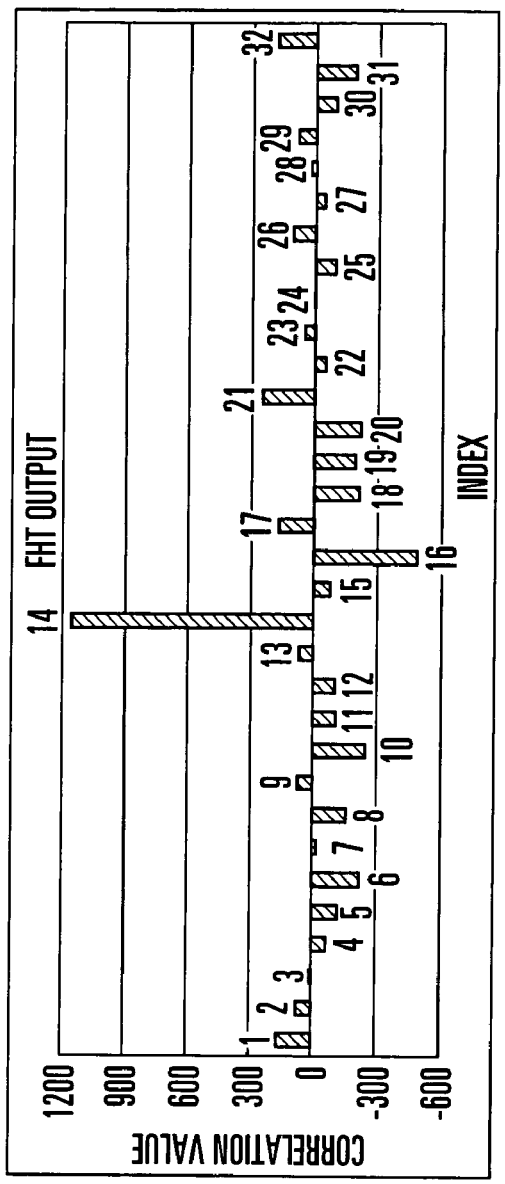
FIG. 13A is a graph showing the input/output characteristics of the fast Hadamard transform section in FIG. 2, and more specifically, correlation values after Hadamard transform with a noise level of ±48.
Figure 13B:
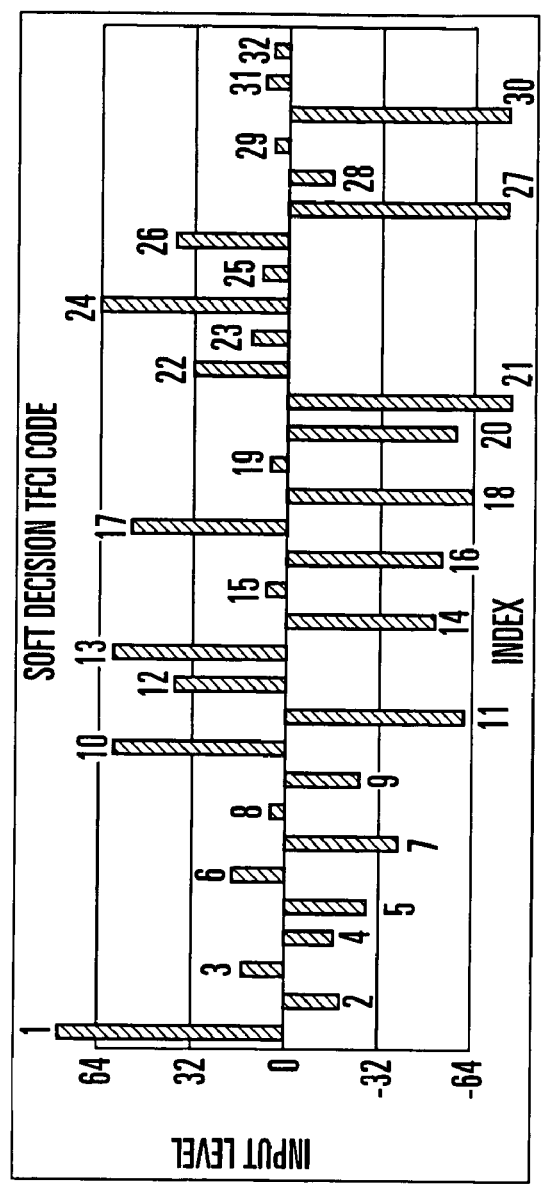
FIG. 13B is a graph showing the input/output characteristics of the fast Hadamard transform section in FIG. 2, and more specifically, input values before Hadamard transform with a noise level of ±48.
Figure 15A:
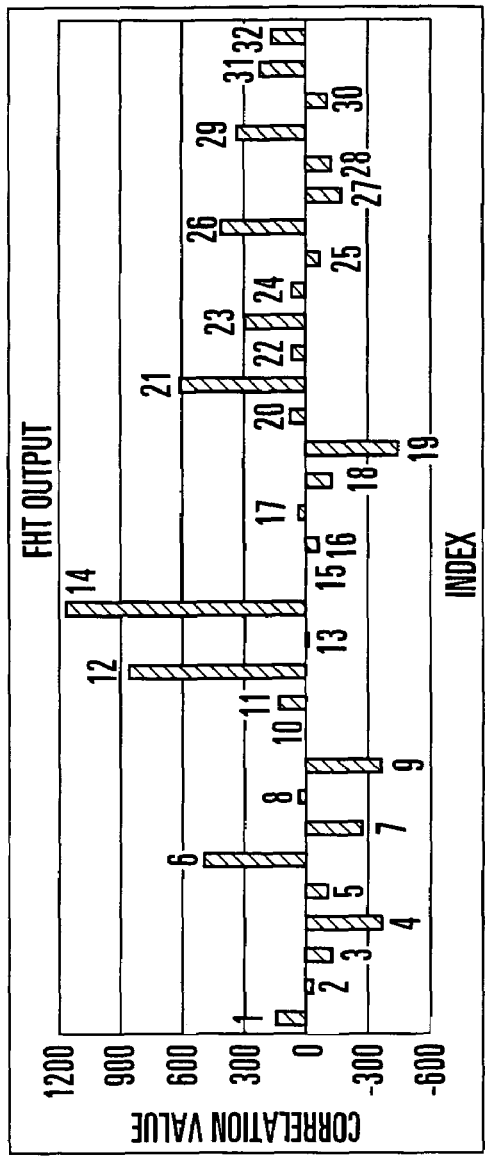
FIG. 15A is a graph showing the input/output characteristics of the fast Hadamard transform section in FIG. 2, and more specifically, correlation values after Hadamard transform with a noise level of ±80.
Figure 15B:
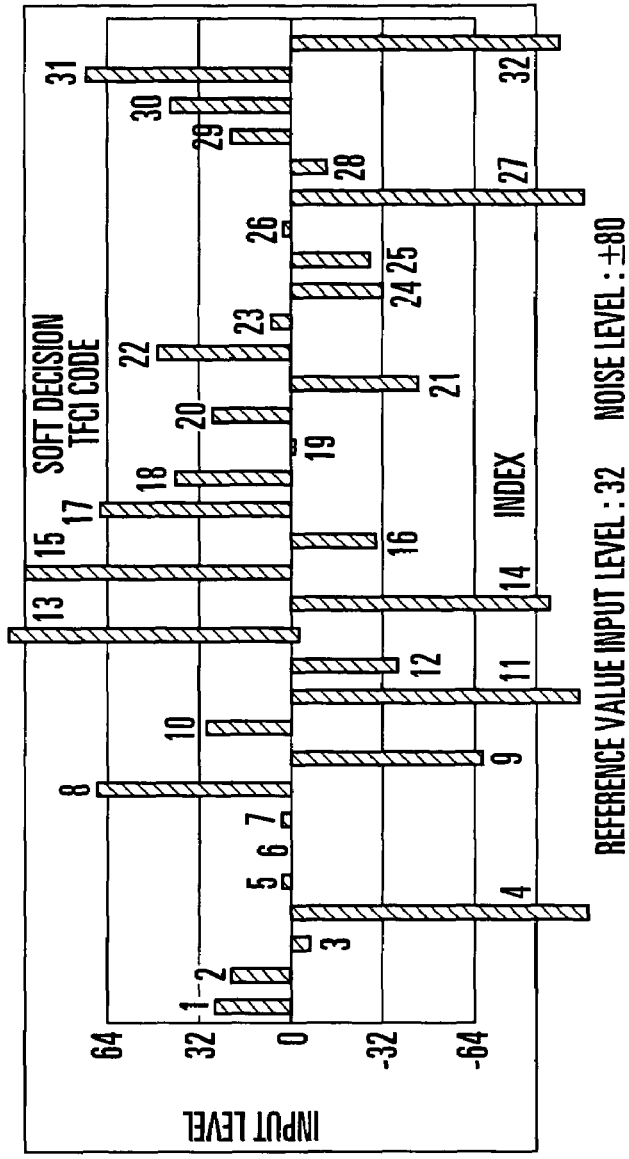
FIG. 15B is a graph showing the input/output characteristics of the fast Hadamard transform section in FIG. 2, and more specifically, input values before Hadamard transform with a noise level of ±80.

The operation of the fast Hadamard transform section 114 which is an important section for this TFCI value calculation will be described below. For the sake of descriptive convenience, 8-bit FHT (Fast Hadamard Transform) will be described with reference to FIG. 7.

Since the code generated by mod2 addition of 32 combinations of Mi, 0, Mi, 1, Mi, 2, Mi, 3, Mi, 4, which are combinations of n=0 to 4 in equation (1), becomes a row vector of a 32nd-order Walsh quadrature matrix, decoding TFCI is equivalent to correlating with a Walsh matrix and detecting a peak value. In order to correlate with the Walsh matrix, many product-sum operations are required. As the Walsh matrix size increases, the required computation amount increases. If this Walsh matrix is broken down into equivalent matrices G1, G2, and G3, an arrangement requiring only addition/subtraction operations (butterfly computation) but requiring no product-sum operation can be implemented. This can reduce the computation amount.

The correlation values calculated by the fast Hadamard transform section 114 and their indexes are input to the peak correlation value determining section 115. The peak correlation value determining section 115 determines an index having the maximum absolute value and positive/negative correlation, and notifies the TFCI determining section of the determination result. The index obtained by the fast Hadamard transform section 114 ranges from 0 to base 31 value constituted by lower 5 bits of a0 to a4 on the transmitting side.

The reason why the peak correlation value determining section 115 determines position/negative correlation is that the code "Mi, 5" is "all 1". When this code is used upon mod2 addition, the correlation calculation result obtained by Hadamard transform becomes a negative correlation peak value.

The TFCI determining section 116 determines a0 to a4 from the index notified from the peak correlation value determining section 115. The TFCI determining section 116 determines a5=0 if a positive peak value is determined from the notified positive/negative correlation, and a5=1 if a negative peak value is determined.

If the TFCI count notified from the dedicated channel control section 4 is 64 or less, the TFCI determining section 116 determines a TFCI value from one index and positive/negative correlation.

If the TFCI count is 65 or more and 128 or less, correlations corresponding to only two combinations of presence/absence (a6=0, 1) of Mi, 6 are calculated. If the TFCI count 129 or more and 256 or less, correlations corresponding to only four combinations of presence/absence (a6=0, 1, a7=0, 1) of Mi, 6, Mi, 7 are calculated. If the TFCI count is 257 or more and 512 or less, correlations corresponding to only eight combinations of presence/absence (a6=0, 1, a7=0, 1, a8=0, 1) of Mi, 6, Mi, 7, Mi, 8 and 16 combinations of presence/absence (a6=0, 1, a7=0, 1, a8=0, 1, a9=0, 1) of Mi, 6, Mi, 7, Mi, 8, Mi, 9 are calculated. These values are input to the fast Hadamard transform section 114. The TFCI determining section 116 therefore sequentially determines a6, a7, a8, and a9 in decreasing order of the absolute values of indexes notified from the peak correlation value determining section 115, and determines the indexes as a0 to a4, and positive/negative determination as a5.

The above operation will be described in further detail by using different drawings and a difference example. FIGS. 8A to 16B show the input/output characteristics of the fast Hadamard transform section 114. FIGS. 8A, 9A, 10A, 11A, 12A, 13A, 14A, 15A, and 16A show correlation values after Hadamard transform. FIGS. 8B, 9B, 10B, 11B, 12B, 13B, 14B, 15B, and 16B show inputs before Hadamard transform. The correlation value characteristic storage section 10 shown in FIG. 1 holds the correlation values after Hadamard transform shown in FIGS. 8A, 9A, 10A, 11A, 12A, 13A, 14A, 15A, and 16A.

FIGS. 8A and 8B show a correlation value output after Hadamard transform (noise level ±0) which is obtained by generating a TFCI code by using a given TFCI value according to equation (1) and inputting, to the fast Hadamard transform section 114, the value obtained by integrating data at a reference value level of 32 with the logic value "0" and "1" being set to 1 (+1) and −1. As is obvious from FIGS. 8A and 8B, the TFCI value can be decoded by detecting the peak value of the correlation value after Hadamard transform and calculating its index. This processing is performed by the peak correlation value determining section 115 and TFCI determining section 116 shown in FIG. 2. The correlation value after Hadamard transform which is shown in FIG. 8A is held in the correlation value characteristic storage section 10 shown in FIGS. 1 and 2.

FIGS. 9B, 10B, 11B, 12B, 13B, 14B, 15B, and 16B show inputs before Hadamard transform when noise levels ±N (N=4, 8, 16, 32, 48, 64, 80, and 96) are added to a reference value level of 32 before Hadamard transform shown in FIG. 5. FIGS. 9A, 10A, 11A, 12A, 13A, 14A, 15A, and 16A show correlation value outputs after Hadamard transform. Note that in this case, random values in the range of ±N are used as noise levels.

As is obvious from FIGS. 8A to 16B, as the noise level N increases, the correlation values between the desired index and other indexes (other Walsh quadrature row vectors), of the correlation values after Hadamard transform shown in FIGS. 8A, 9A, 10A, 11A, 12A, 13A, 14A, 15A, and 16A, increase.

Specific numerical indicators as TFCI decoding characteristics will be proposed by using this. This processing is performed by the correction value calculating section 9. The correlation values after Hadamard transform in FIGS. 9A, 10A, 11A, 12A, 13A, 14A, 15A, and 16A are held in the correlation value characteristic storage section 10 and calculated by the correction value calculating section 9.

The correction value calculating section 9 calculates a characteristic indicator value A from the correlation characteristics held in the correlation value characteristic storage section 10 according to the following equations (2) and (3). The characteristic indicator value A is used as information for controlling the correction value determined by the correction value calculating section 9.

Letting B be the sum total of the absolute correlation values after Hadamard transform, and C be the peak value of the absolute correlation values after Hadamard transform, an average D of noise components is given by equation (2):

$$\langle \text{average } D \text{ of noise components} \rangle = (\langle \text{total sum } B \text{ of absolute correlation values} \rangle - \langle \text{peak value } C \text{ of absolute correlation values} \rangle)/32 \quad (2)$$

If the relative value between the peak value C of the absolute values and the average D of the noise components is the characteristic indicator value A, the value A is calculated by equation (3):

$$\langle \text{characteristic indicator value } A \rangle = 10 \times \log (\langle \text{peak value } C \text{ of absolute values of correlation values} \rangle / \langle \text{average } D \text{ of noise components} \rangle) \quad (3)$$

The following table shows the characteristic indicator value A for the noise level N in FIGS. 9A to 16B. The correction value calculating section 9 determines a correction value in the data correcting section 1 on the basis of the information of the characteristic indicator value A, and feeds back the information obtained from the TFCI decoding characteristics to dedicated physical data, thereby improving the reception characteristics.

| Noise Level ±N | Characteristic Indicator Value |
|---|---|
| 4 | 19.9 |
| 8 | 17.2 |
| 16 | 14.2 |
| 32 | 10.8 |
| 48 | 9.1 |
| 64 | 7.6 |
| 80 | 5.9 |
| 96 | 5.1 |

Information which can be used to control a correction value in the correction value calculating section 9 further includes the result obtained by comparing the TFCI code reconstructed from the TFCI value decoded by the TFCI determining section 116 with the TFCI code input from the symbol data determining section 8.

As shown in FIG. 2, a TFCI code generator 119 codes the TFCI code again from the decoding result obtained by the TFCI determining section 116, and inputs the resultant data to the hard decision TFCI code comparing section 118.

The hard decision TFCI code comparing section 118 calculates the TFCI bit error between the TFCI code separated by the symbol data determining section 8 in FIG. 1 and the TFCI code reproduced by the TFCI code generator 117, and feeds back the resultant information to the correction value calculating section 9, thereby determining at which slot position the error has occurred. In this manner, this information is effectively used.

Note that since the mapping insertion slot position of a TFCI bit is described in detail in TS25.212 of 3GPP, a description thereof will be omitted.

The manner of correction processing for dedicated physical data channel data by the correction value calculating section 9 and data correcting section 1 will be described below with reference to FIGS. 17A to 17C.

FIG. 17A shows a dedicated physical data channel (DPDCH). FIG. 17B shows only the TFCI bit portion of a dedicated physical control channel (DPCCH). FIG. 17C shows the characteristic indicator values A calculated from reception TFCI bits and the states of the respective frames.

A reference characteristic indicator value S as a reference for the characteristic indicator values A is set in advance. Assume that the reference characteristic indicator value S is a parameter having a proper value in accordance with the communication quality required for a service. For example, the reference characteristic indicator value S is a parameter having a value proportional to the target SIR notified from a host apparatus.

The characteristic indicator values A (A1 to A4) in the respective frames are calculated according to equations (2) and (3), and each value is compared with the reference characteristic indicator value S.

If S−A<0 (the characteristic indicator value A is larger than the reference characteristic indicator value S), the reception characteristic state is considered good, and hence no correction is made (the case wherein S−A=0 (the characteristic indicator value A is equal to the reference characteristic indicator value S) may be included in either the above case or the following case).

If S−A>0 (the characteristic indicator value A is smaller than the reference characteristic indicator value S), the reception characteristic state is considered degraded, and hard decision is performed with respect to the received TFCI bit and the bit which is TFCI-decoded first and then TFCI-coded again. If it is determined as a result of the hard decision that no error has occurred, it is considered that the code itself is correct but a level fluctuation has occurred, and correction is made to smooth the amplitude level of DPDCH. The degree of smoothing increases as the value of S−A increases.

If the hard decision with respect to the received TFCI bit and the bit which is TFCI-decoded first and then TFCI-coded again indicates the presence of an error, it is considered that a large level fluctuation and phase inversion have occurred. In this case, correction is made to invert the sign of the amplitude data of DPDCH at the same temporal position as the error.

Another embodiment will be described next, in which a reception SIR value is also used as information for controlling a correction value in a correction value calculating section 9.

A reception SIR measuring section 7 calculates a reception SIR on the basis of the pilot symbol of a known bit pattern extracted from a dedicated physical control channel (DPCCH) by a symbol data determining section 8, and notifies the correction value calculating section 9 of the SIR.

The correction value calculating section 9 performs data correction control in consideration of not only the TFCI decoding characteristics but also the quality of the reception SIR notified from the reception SIR measuring section 7. In this case as well, the result of hard decision on a TFCI bit can be used.

As has been described above, in decoding data on a dedicated physical control channel (DPCCH) for transferring various kinds of control information including TFCI information and data on a dedicated physical control channel (DPCCH) for transferring user data, which data are transmitted while being mapped to in-phase components (I-axis) of a single system and quadrature phase components (Q-axis), the fact that TFCI coding is performed by using a Walsh quadrature code is utilized such that the characteristic information of the correlation values obtained by Hadamard transform is fed back to the dedicated physical data channel to control an optimal correction value for the dedicated physical data channel in accordance with the quality of the characteristics. This makes it possible to improve the reception characteristics of the dedicated physical data channel.

According to the present invention, the fact that TFCI coding is performed by using a Walsh quadrature code is utilized such that the characteristic information of the correlation values obtained by Hadamard transform is fed back to the dedicated physical data channel to control an optimal correction value for the dedicated physical data channel in accordance with the quality of the characteristics. Therefore, the reception characteristics of the dedicated physical data channel can be improved.

What is claimed is:

1. A decoding apparatus comprising:

reception means for receiving data on a dedicated physical control channel and data on a dedicated physical data channel, which are coded into a complex code of a single system which is to be transmitted as an uplink signal from a mobile unit to a base station in a 3rd generation cell phone system, said complex code including a quadrature code representation of Transport Format Combination Indicator (TFCI) information contained within said control channel data;

TFCI decoding characteristic feedback means for using quadrature correlation characteristics of said quadrature code to determine TFCI decoding characteristics of a coded TFCI code on the dedicated physical control channel; and dedicated physical data channel correcting means for performing data correction for the dedicated physical data channel on the basis of a determination result on the TFCI decoding characteristics, and wherein said TFCI decoding characteristic feedback means comprises dedicated channel control means for controlling a dedicated channel, outputting a TFCI count corresponding to a service, and outputting a decoding parameter corresponding to a received TFCI value, data correcting means for processing a correction value calculated from TFCI decoding characteristics of a dedicated physical control channel with respect to data on a dedicated physical data channel which is received from a mobile unit, de-interleave rate de-matching means for channel-decoding an output from said data correcting means on the basis of a decoding parameter from said dedicated channel control means, and error correcting/decoding means for decoding an output from said deinterleave rate dematching means while performing error correction for the output to obtain decoded data on the dedicated physical data channel, and said dedicated physical data channel correcting means comprises symbol data determining means for extracting/separating a TFCI code from data on a dedicated physical control channel, soft decision TFCI decoding means for TFCI-decoding a TFCI code output from said symbol data determining means on the basis of a TFCI count from said dedicated channel control means, transmitting an obtained TFCI value to said dedicated channel control means, and outputting correlation values with a Walsh quadrature vector at the time of TFCI decoding, correlation value characteristic storage means for sequentially storing correlation values output from said soft decision TFCI decoding means, and correction value calculating means for determining TFCI decoding characteristics from a plurality of correlation values stored in said correlation value characteristic storage means, calculating the correction value, and outputting the correction value to said data correcting means.

2. An apparatus according to claim 1, wherein said soft decision TFCI decoding means comprises data interchanging means for changing a data order of a reception TFCI code to allow the code to be subjected to fast Hadamard transform as a Walsh quadrature vector, a mask code correlation table which is a code table of 16 combinations of mask codes in a TFCI code which are obtained by modulo 2 addition, mask code correlation calculating means for calculating a correlation between an output code from said data interchanging means and said mask code correlation table, fast Hadamard transform means for performing Hadamard transform of a code output from said mask code correlation calculating means, peak correlation value determining means for determining an absolute peak value of Hadamard transformed data output from said fast Hadamard transform means, performing positive/negative determination on the peak value, and determining an index thereof to obtain correlation values with a Walsh quadrature vector at the time of TFCI decoding, and TFCI determining means for determining a TFCI value from a determination result from said peak correlation value determining means.

3. An apparatus according to claim 2, wherein said soft decision TFCI decoding means further comprises TFCI code generating means for generating a TFCI code from a TFCI value obtained by said TFCI determining means, hard decision TFCI code comparing means for comparing a TFCI code generated by said TFCI code generating means with a TFCI code input to said soft decision TFCI decoding means to determine whether an error has occurred, and said correction value calculating means controls calculation of the correction value in accordance with an error determination result obtained by said hard decision TFCI code comparing means.

4. An apparatus according to claim 1, wherein said apparatus further comprises reception Signal-to-Interference Ratio (SIR) measuring means for measuring a reception SIR from a known pilot symbol on the dedicated physical control channel, and said dedicated physical data channel correcting means performs data correction for the dedicated physical data channel on the basis of a determination result on the TFCI decoding characteristics and the measurement result on the reception SIR.

5. A decoding method comprising:

the first step of receiving data on a dedicated physical control channel and data on a dedicated physical data channel, which are coded into a complex code of a single system which is to be transmitted as an uplink signal from a mobile unit to a base station in a 3rd generation cell phone system, said complex code including a quadrature code representation of Transport Format Combination Indicator (TFCI) information contained within said control channel data;

the second step of using quadrature correlation characteristics of said quadrature code to determine TFCI decoding characteristics of a coded TFCI code on the dedicated physical control channel, wherein the second step comprises the step of extracting/separating a TFCI code from received data on a dedicated physical control channel, the step of TFCI decoding the TFCI code, obtaining correlation values with a Walsh quadrature vector, and sequentially storing the correlation values, the step of determining TFCI decoding characteristics from a plurality of stored correlation values, the step of calculating a correction value for data correction on the dedicated physical data channel, the step of changing a data order of a reception TFCI code to allow the code to be subjected to fast Hadamard transform as a Walsh quadrature vector, the step of calculating a correlation between the TFCI code after interchanging and a preset code table of 16 combinations of mask codes in a TFCI code which are obtained by modulo 2 addition, and performing fast Hadamard transform, and the step of determining an absolute peak value of Hadamard-transformed data, performing positive/negative determination on the peak value, and determining an index thereof to obtain correlation values with a Walsh quadrature vector at the time of the TFCI decoding; and the third step of performing data correction for the dedicated physical data channel on the basis of a determination result on the TFCI decoding characteristics.

6. A method according to claim 5, wherein the second step comprises the step of generating a TFCI code in accordance with a TFCI value obtained from determination results on the absolute peak value of Hadamard-transformed data, positive/negative decision on the peak value, and the index thereof, the step of determining the presence/absence of an error by comparison with the reception TFCI code, and the step of controlling calculation of the correction value in accordance with the error determination result.

7. A method according to claim 5, wherein the method further comprises the step of measuring a reception Signal-to-Interference Ratio (SIR) from a known pilot signal on the dedicated physical control channel, and in the third step, data correction is performed for the dedicated physical data channel on the basis of the determination result on the TFCI decoding characteristics and the measurement result on the reception SIR.

* * * * *